(12) United States Patent
Martin et al.

(10) Patent No.: US 8,075,281 B2
(45) Date of Patent: Dec. 13, 2011

(54) ROTARY PRESSURE TRANSFER DEVICE

(75) Inventors: Jeremy Martin, Oakland, CA (US); Richard L. Stover, Oakland, CA (US)

(73) Assignee: Energy Recovery, Inc., San Leandro, CA (US)

( * ) Notice: Subject to any disclaimer, the term of this patent is extended or adjusted under 35 U.S.C. 154(b) by 247 days.

(21) Appl. No.: 12/407,649

(22) Filed: Mar. 19, 2009

(65) Prior Publication Data
US 2009/0180903 A1 Jul. 16, 2009

Related U.S. Application Data

(63) Continuation of application No. PCT/US2007/079674, filed on Sep. 27, 2007.

(60) Provisional application No. 60/828,175, filed on Oct. 4, 2006.

(51) Int. Cl.
*E21B 43/12* (2006.01)

(52) U.S. Cl. .............................. 417/64; 417/65; 417/69

(58) Field of Classification Search .................... 417/64, 417/65, 69; 60/39.45; 415/104
See application file for complete search history.

(56) References Cited

U.S. PATENT DOCUMENTS

| | | | |
|---|---|---|---|
| 3,095,704 A * | 7/1963 | Spalding ..................... | 60/39.45 |
| 3,431,747 A | 3/1969 | Hashemi et al. | |
| 3,746,128 A | 7/1973 | Wunsch | |
| 4,360,316 A * | 11/1982 | Rahnke ........................... | 417/64 |
| 4,796,595 A | 1/1989 | El-Nashar et al. | |
| 4,859,153 A * | 8/1989 | Mayer ............................ | 417/64 |
| 4,887,942 A | 12/1989 | Hauge | |
| 5,338,158 A | 8/1994 | Hauge | |
| 6,449,939 B1 * | 9/2002 | Snyder ............................ | 60/776 |
| 6,537,035 B2 | 3/2003 | Shumway | |
| 6,540,487 B2 | 4/2003 | Polizos | |
| 6,659,731 B1 | 12/2003 | Hauge | |
| 6,773,226 B2 | 8/2004 | Al-Hawaj | |
| 2006/0032808 A1 * | 2/2006 | Hauge ..................... | 210/321.65 |

* cited by examiner

*Primary Examiner* — Charles Freay
*Assistant Examiner* — Todd D Jacobs
(74) *Attorney, Agent, or Firm* — Fitch Even Tabin & Flannery

(57) ABSTRACT

A pressure transfer device for the transfer of pressure energy from a high pressure fluid stream to a lower pressure fluid stream wherein a generally cylindrical housing (61) contains a rotor (63) having a plurality of channels (65) extending axially therethrough that revolves about a central stator (67) or within a surrounding sleeve (73) and a pair of end covers (69, 71) which slidingly and sealingly interface with respective planar end faces (68) of the rotor. The end covers (69, 71) and the accompanying components of the device are constructed so as to allow the channels to be at least twice filled with a high pressure first liquid during each revolution of the rotor and thus discharge twice the volume of a pressurized second liquid than if they were filled only one with high pressure liquid.

20 Claims, 4 Drawing Sheets

FIG. 1 - PRIOR ART

ROTARY PRESSURE TRANSFER DEVICE

This application is a continuation of International Application No. PCT/US2007/079674 filed Sep. 27, 2007, which claims priority from U.S. Provisional Patent Application Ser. No. 60/828,175 filed Oct. 4, 2006, the disclosures of both of which are incorporated herein by reference.

FIELD OF THE INVENTION

The invention relates to rotary pressure transfer devices where a first fluid under a high pressure hydraulically communicates with a second, lower pressure fluid in a rotor and transfers pressure between the fluids producing a high pressure discharge stream of the second fluid. More particularly, the invention relates to rotary pressure transfer devices wherein end cover designs and associated rotor arrangements are improved to increase efficiency.

BACKGROUND OF INVENTION

Many industrial processes, especially chemical processes, operate at elevated pressures. These processes often require a high pressure fluid feed, which may be a gas, a liquid or a slurry, to produce a fluid product or effluent. One way of providing a high pressure fluid feed to such an industrial process is by feeding a relatively low pressure stream through a pressure transfer device to exchange pressure between a high pressure stream and the low pressure feed stream. One particularly efficient type of pressure transfer device utilizes a rotor having axial channels wherein hydraulic communication between the high pressure fluid and the low pressure fluid is established in alternating sequences.

U.S. Pat. Nos. 4,887,942; 5,338,158; 6,537,035; 6,540,487; 6,659,731 and 6,773,226 illustrate rotary pressure transfer devices of the general type described herein for transferring pressure energy from one fluid to another. The operation of this type of device is a direct application of Pascal's Law: "Pressure applied to an enclosed fluid is transmitted undiminished to every portion of the fluid and to the walls of the containing vessel." Pascal's Law holds that, if a high pressure fluid is brought into hydraulic contact with a low pressure fluid, the pressure of the high pressure fluid is reduced, the pressure of the low pressure fluid is increased, and such pressure exchange is accomplished with minimum mixing. A rotary pressure transfer device of the type of present interest applies Pascal's Law by alternately and sequentially (1) bringing a channel which contains a first lower pressure fluid into hydraulic contact with a second higher pressure fluid, thereby pressurizing the first fluid in the channel and causing an amount of first fluid that was in the channel to exit to the volumetric extent that higher pressure second fluid takes its place, and thereafter (2) bringing this channel into hydraulic contact with a second entrance chamber containing the incoming stream of lower first pressure fluid which slightly pressurizes the second fluid then in the channel, causing discharge of the second fluid at still lower pressure.

The net result of the pressure transfer process, in accordance with Pascal's Law, is to cause the pressures of the two fluids to approach each other. In a chemical process, such as sea water reverse osmosis which may, for example, operate at high pressures, e.g., 700-1200 pounds per square inch gauge (psig), a seawater feed may generally be available at a low pressure, e.g., atmospheric pressure to about 50 psig, and there will likely also be a high pressure brine stream from the process available at about 650-1150 psig. The low pressure seawater stream and the high pressure brine stream can both be fed to such a rotary pressure transfer device to advantageously pressurize the seawater while depressurizing the waste brine. The advantageous resultant effect of the rotary pressure transfer device in such an industrial process is a very substantial reduction in the amount of high pressure pumping capacity needed to raise the seawater feed stream to the high pressure desired for efficient operation; this can often result in an energy reduction of up to 65% for such a process and may allow a corresponding reduction in the required pump size.

In such a rotary pressure transfer device, there is generally a rotor with a plurality of parallel, open-ended channels. The rotor may be driven by an external force, but it is preferably driven by the directional entry of the fluid streams into the channels through an end cover, as known in this art. During rotation, there is hydraulic communication of the fluid residing in each channel, alternately and exclusively, with an inlet passageway either at one end of the rotor or at the other end. More specifically, the incoming higher pressure fluid enters the channel through an end cover from a high pressure inlet chamber, causing simultaneous discharge from the other end of the channel, and then, a very short interval later, the channel comes into exclusive communication with an incoming lower pressure fluid entering through the opposite end cover from an inlet chamber at the other end. As a result, axially countercurrent flow of fluids is alternately effected in each channel of the rotor, creating two discharge streams, for example a greatly increased pressure seawater stream and a greatly reduced pressure brine stream.

In a rotary pressure transfer device having such a rotating rotor, there will be many very brief intervals of hydraulic communication between the plurality of longitudinal channels in the rotor and both of the chambers at the opposite ends that are holding the two fluids, which chambers are otherwise hydraulically isolated from each other. Minimal mixing occurs within the channels because operation is such that the channels will each have a zone of relatively dead fluid that serves as a buffer or interface between the oppositely entering fluids; each fluid enters and exits from one respective end of the rotor. As a result, for example, a high pressure, higher salt concentration, brine stream can transfer its pressure to an incoming low pressure seawater stream without significant mixing.

In such prior art devices, the rotor usually rotates in a cylindrical sleeve, with its flat end faces slidingly and sealingly interfacing with the opposite end cover plates. The rotor in the pressure transfer device is often supported by a hydrostatic bearing and driven by either the streams of fluids entering the rotor channels or by a motor. To achieve extremely low friction operation, such a rotary pressure transfer device usually does not use rotating seals. Instead, fluid seals and fluid bearings are often used, and extremely close tolerance fits are used to minimize leakage.

The opposite end covers each have an inlet opening and a discharge opening that are located at diametrically opposed locations in their inward faces with which openings the channels in the rotor will alternately become aligned. The end covers are usually peripherally supported by contact with the sleeve within which the rotor revolves. Thus, the longitudinal rotor channels, at one end, alternately hydraulically connect with a high pressure brine inlet, for example, and then with a brine discharge outlet, while the same channel, at its other end, respectively hydraulically communicates with a high pressure seawater discharge outlet and then with a low pressure seawater inlet. In both instances, there is discharge of liquid from the opposite end of the channel through a discharge opening in the end cover to the extent that filling occurs at the feed end. As the rotor rotates between these intervals of alternate hydraulic communication, the channels are briefly sealed off from communication with either of the two openings in each end cover face.

In rotary pressure transfer devices of this general type, the volume of liquid that flows into and out of such a device as a result of rotation of the cylindrical rotor is at least partially dependent upon the total volume of the longitudinal channels in such a rotor and the ability to feed and withdraw liquid to and from those channels. Ways of increasing the efficiency of these pressure transfer devices have been continuously sought.

SUMMARY OF THE INVENTION

Present day commercial rotary pressure transfer devices employ a rotor having a plurality of channels that are often reasonably widely spaced apart and a pair of opposite end covers which each have one inlet and one outlet. Accordingly, as the rotor makes one complete revolution, each channel will fill twice, once with high pressure liquid entering from one end and once with low pressure liquid entering from the opposite end, and likewise discharge twice. Each fill and discharge, of course, occurs as the longitudinal channel rotates past the respective aligned pairs of inlets and outlets in the opposite end covers.

It has now been found that it is practical to employ two or more inlets and two or more outlets in each end cover, arranging them so that each channel will fill at least twice at each end while accordingly discharging at least twice at the opposite end. As a result, such a rotary device will potentially pump, i.e. increase the pressure of, a liquid volume at least about twice as large during each revolution than similar prior art device with only a single inlet in each end cover.

In one particular aspect, there is provided a pressure transfer device for transferring pressure energy from a high pressure first fluid to a lower pressure second fluid to provide a pressurized second fluid, which device comprises a rotatably mounted cylindrical rotor having a pair of opposite planar end faces with at least two channels extending axially therethrough between openings located in said planar end faces; and a pair of opposite end covers having axially inward and outward end surfaces, with said axially inward end surfaces of each having flat regions that interface with and slidingly and sealingly engage said respective planar end faces of said rotor, each said end cover having two or more inlet passageways and two or more discharge passageways which at least four passageways open into said axially inward said end surfaces, said end covers being aligned so that when one said channel in said rotor is aligned with an inlet passageway opening in one said end cover, it is also aligned with a discharge passageway opening in said opposite end cover, said inlet passageway openings and said discharge passageway openings in said same end cover being constantly sealed from one another during the operation by a sealing region at the interface between said rotor planar end face and said end cover, whereby during revolution of said rotor said channel openings are, in alternating sequence, brought into partial or full alignment with both an inlet passageway opening in one said end cover and a discharge passageway opening in the opposite said end cover and then into partial or full alignment with both a discharge passageway opening in said one end cover and an inlet passageway opening in said opposite end cover, at least twice during each revolution of said rotor, so that each said channel is at least twice supplied with the high pressure first fluid and at least twice discharges pressurized second fluid.

In another particular aspect, there is provided a method for transferring pressure energy from a high pressure first fluid to a lower pressure second fluid to provide a pressurized second fluid, which method comprises the steps of rotatably mounting a cylindrical rotor in a housing, which rotor has a pair of opposite planar end faces and has at least two channels extending longitudinally therethrough between openings located in said planar end faces; disposing a pair of opposite end covers in the housing having axially inward surfaces with flat surface regions so that their axially inward end surfaces interface with and slidingly and sealingly engage said planar end faces of said rotor, which end covers each have a plurality of inlet passageways and a plurality of discharge passageways which open into said flat surface regions, supplying a high pressure first fluid to said inlet passageways in one end cover while simultaneously discharging a pressurized second fluid from said aligned discharge passageways in the end cover at the opposite end, and causing said rotor to revolve about its axis so said channel openings are respectively brought into partial or full alignment with an inlet passageway opening in one end cover and a discharge passageway opening in the other end cover at least twice during each revolution of the rotor, whereby an increased volume of pressurized second liquid is discharged for each revolution of the rotor because each channel is filled and discharged at least twice.

DETAILED DESCRIPTION OF THE PREFERRED EMBODIMENTS

Figure 1:
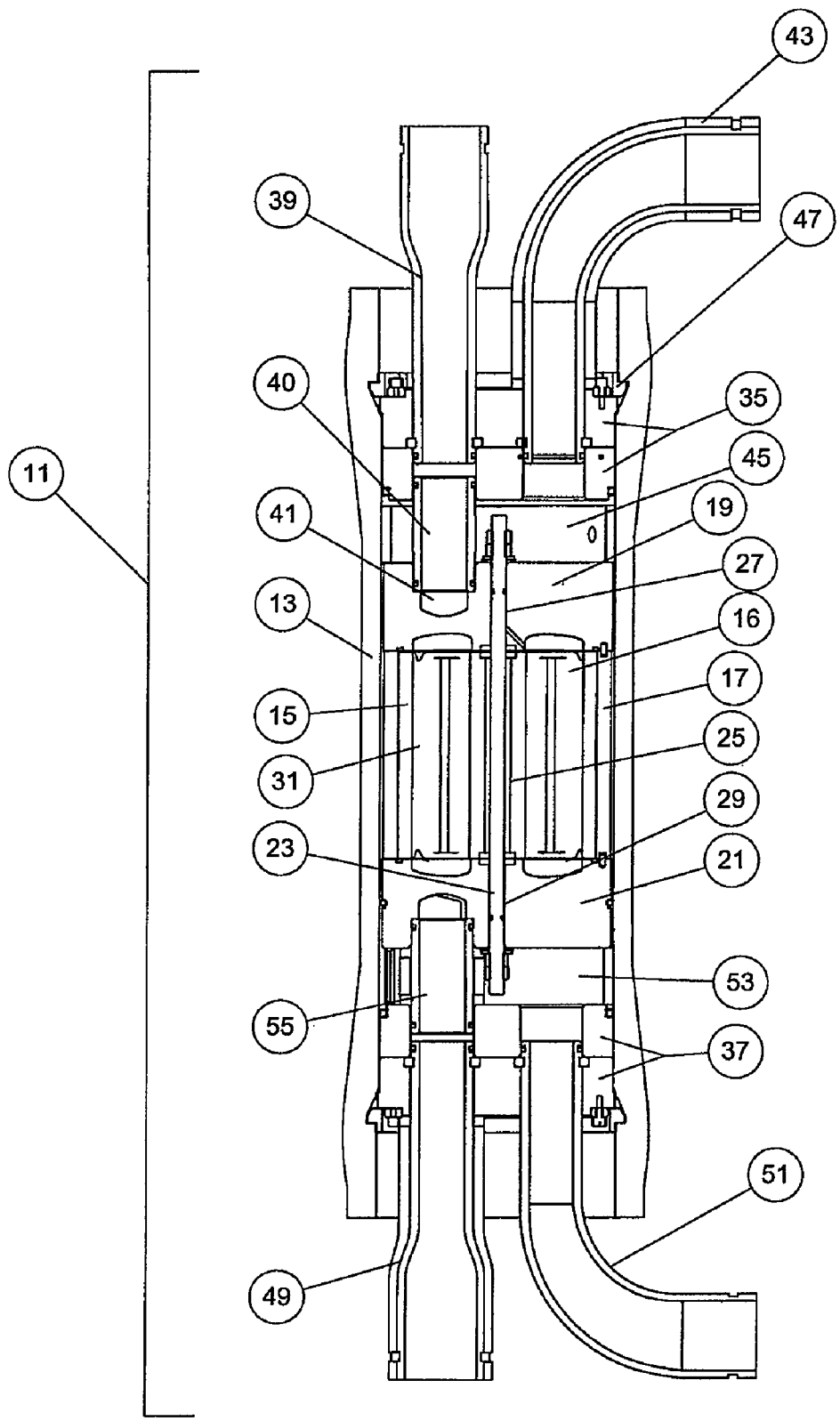
FIG. 1 is a front cross-sectional view of a prior art pressure transfer device of this general type which uses a rotor that rotates about its axis.

Shown in FIG. 1 is a rotary pressure transfer device 11 of the general type of those of the prior art that includes an elongated, generally cylindrical housing or body 13 in which there is disposed a cylindrical rotor 15 having a plurality of longitudinal channels 16 which extend end-to-end and open onto the respective end faces of the rotor. The rotor 15 revolves within a surrounding tubular sleeve 17, and two end covers 19, 21 having inlet and outlet openings respectively close the otherwise open ends of the tubular sleeve. For purposes of convenience of explanation, the components are referred to as upper and lower end covers in accordance with the orientation of the device in the drawing. However, such is merely used for convenience as it should be understood that the device may be operated in any orientation, vertical, horizontal or otherwise. To permit these internal components to be handled as a unit, they are often united as a subassembly through the use of a central rod or shaft 23 which is located in an elongated chamber 25 disposed axially of the rotor, which rod also passes through a pair of aligned axial passageways 27, 29 in the upper and lower end covers. This threaded tension rod 23 is then secured by washers, O-rings and hex nuts or the like to create the subassembly. This arrangement peripherally seats the two end covers 19,21 in abutting contact with the respective ends of the tubular sleeve 17, and the tolerances are such that, when the rotor 15 is revolving so as to transfer pressure between aqueous solutions or the like, there is a very thin liquid seal created between the upper and lower end faces of the rotor and the juxtaposed inward end faces of the upper and lower end covers 19, 21. If desired, short dowel pins 31 can be employed to assure the end covers are maintained in precise alignment with the supporting tubular sleeve.

The cylindrical outer housing 13 is closed by upper and lower plate assemblies 35, 37 to each of which a pair of inlet and outlet conduits are respectively secured. For example, the upper plate assembly 35 through which a first high pressure liquid might enter is secured within the housing at a location spaced from the upper end cover 19. An inlet elbow conduit 43 is seated in this plate assembly 35 and discharges into a short plenum chamber 45 which is created between the outward surface of the upper end cover and the undersurface of the upper plate assembly 35. A low pressure, straight, discharge conduit 39 is connected as by a nipple 40 in fluidtight arrangement to a discharge passageway 41 in the upper end cover 19, and this conduit 39 extends through the upper plate assembly to a location where it is then suitably connected to discharge piping or the like. Details of the arrangement are shown in U.S. Pat. No. 7,201,557, the disclosure of which is incorporated herein by reference.

A similar construction exists at the lower end where a second inlet stream of lower pressure enters through a straight conduit 49 that is jointed to a nipple 55 that is seated in the inlet passageway of the lower end cover 21. An elbow discharge conduit 51 is seated in an outer lower plate assembly 37, and flow enters it through a similar plenum chamber 53 located between the lower end cover 21 and the interior surface of the lower plate assembly. The second liquid, to which pressure is being transferred in the device 11, discharges from the rotor channels through a discharge opening in the lower end cover into the plenum chamber 53 and exits via the elbow conduit 51.

For example in operation, low pressure seawater at about 30 psig is supplied, as by pumping, into the straight conduit 49 at the lower end of the device, and high pressure brine from a reverse osmosis operation is supplied to the elbow inlet conduit 43 at the upper end of the device at, e.g. about 770 psig. The passageways in the end covers 19, 21 are oriented such that the entering liquid streams at each end will cause the rotor 15 to revolve, as well known in this art, with most of the force being supplied by the high pressure brine. The high pressure brine fills the upper plenum chamber 45 and flows through a shaped inlet passageway 57 in the upper end cover 19 so as to sequentially enter the upper end of each channel 16 in the rotor as the rotor revolves, supplying high pressure liquid to that channel while it is in communication therewith; this simultaneously causes the same amount of liquid, e.g. seawater, to be discharged from the opposite end of the longitudinal channel at about the pressure of the incoming brine. Discharge flow of the now pressurized second liquid (i.e. seawater) travels through an outlet passageway in the lower end cover 21 and the lower plenum 53, and it then exits through the elbow conduit outlet 51. When a channel 16 next become aligned with the inlet passageway in the inward face of the lower end cover 21 and the outlet passageway 41 in the upper end cover 19, lower pressure seawater flows into the lower end of the channel in approximately the same volumetric amount, causing discharge of the now depressurized brine from the upper end of the device 11 through the straight outlet conduit 39.

Figure 2:
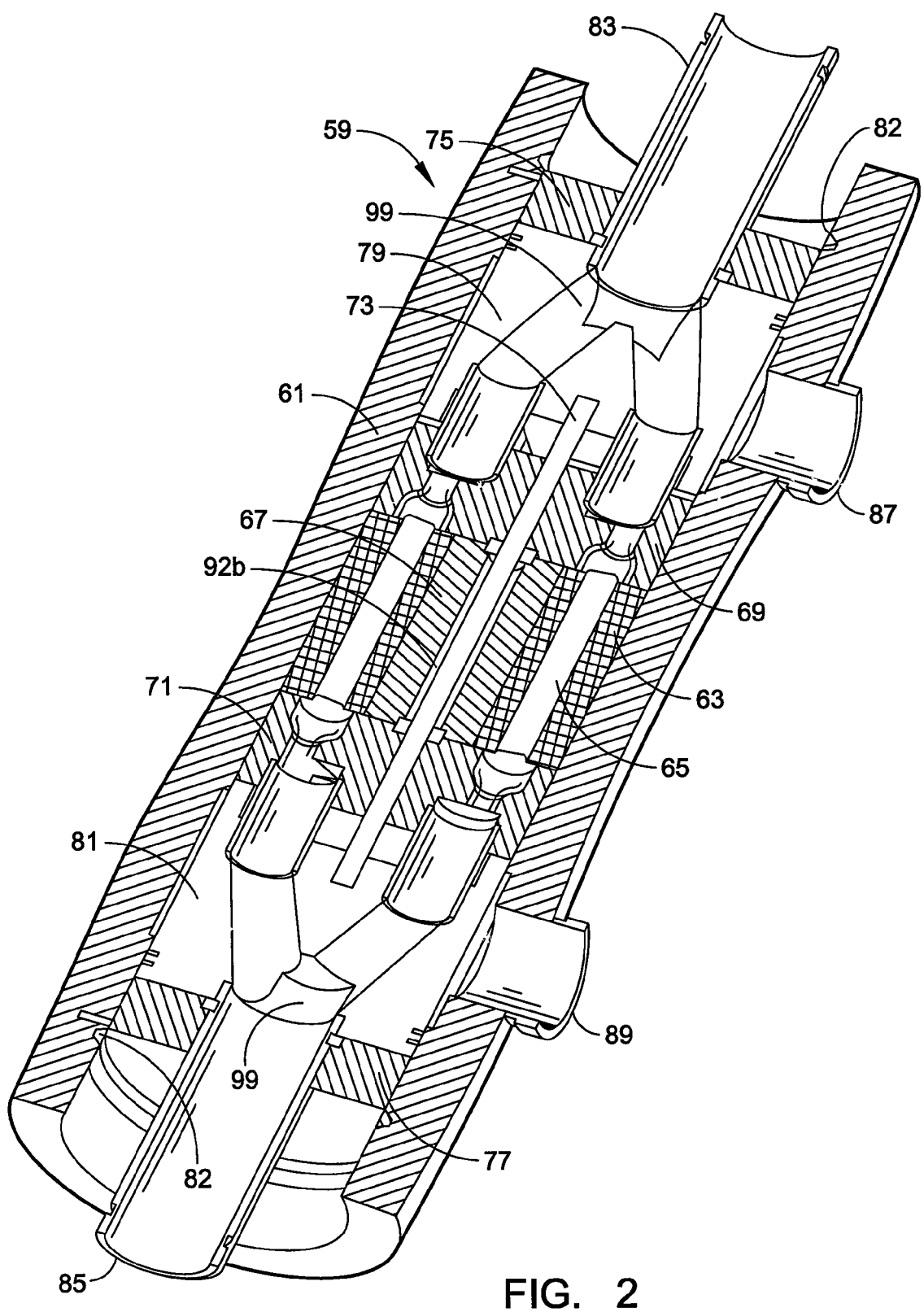
FIG. 2 is a perspective view shown in cross-section of a pressure transfer device of this general type which uses a rotor that rotates about a central stator, which device incorporates various novel aspects.
Figure 3:
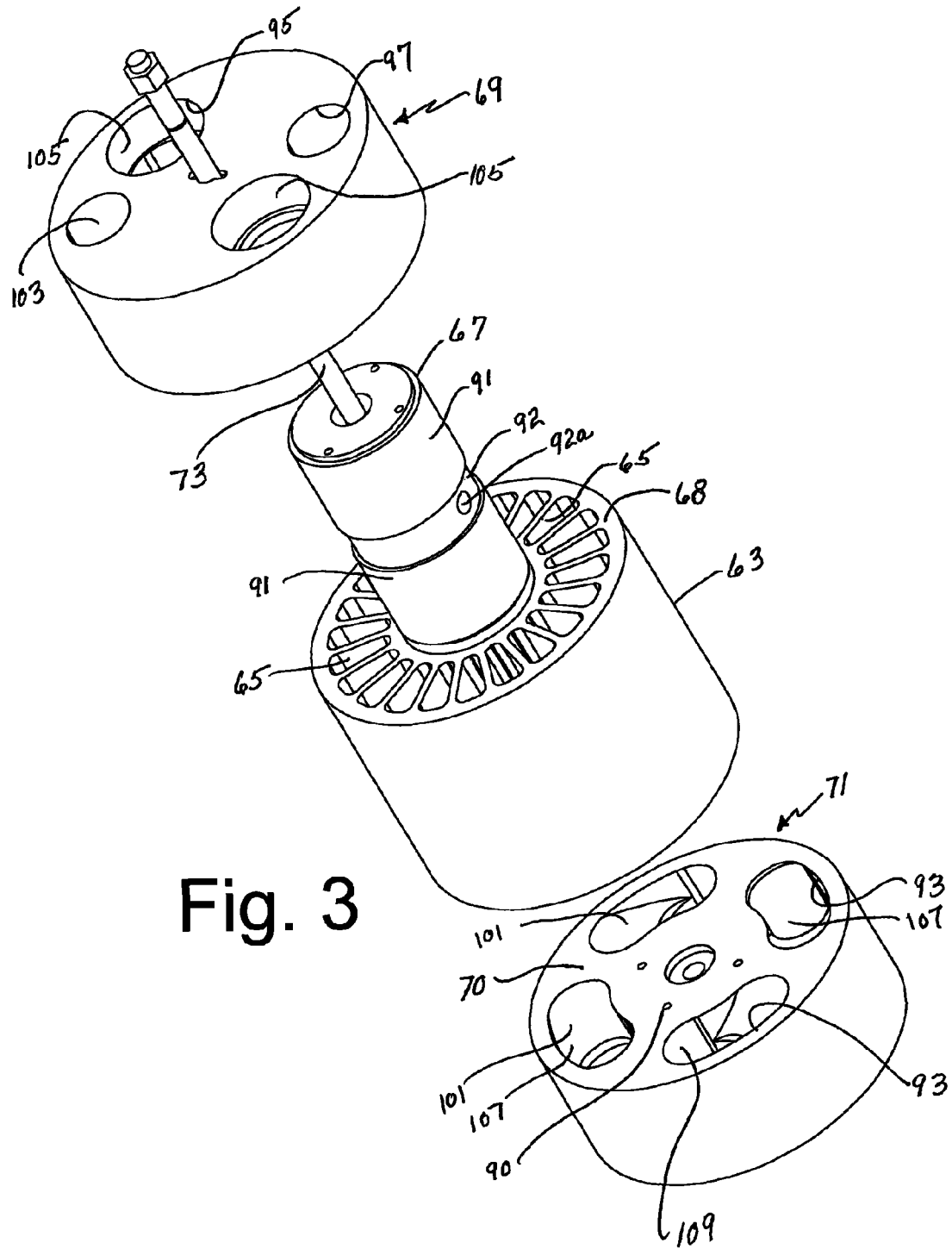
FIG. 3 is an exploded perspective view enlarged in size of a subassembly of two end covers, a rotor, a stator and a tension rod as employed in the rotary pressure transfer device of FIG. 2.

In the FIGS. 2 and 3 embodiment, a pressure transfer device 59 is shown which embodies certain novel features; this embodiment essentially differs on its exterior from the FIG. 1 prior art device by having one large, axially located conduit at the upper end and at the lower end and two side conduits, which respectively communicate with one of the plenum chambers hereinbefore described. More specifically, the pressure transfer device 59 shown in FIG. 2 includes a generally cylindrical outer body or housing 61 in which a rotor 63 having a plurality of longitudinally extending channels 65 revolves journalled about a central stator 67, with planar end faces 68 of the rotor 63 sealingly interfacing with juxtaposed flat regions of the axially inward surfaces 70 of an upper end cover 69 and a lower end cover 71. A centrally disposed tension rod 73 unites the end covers, stator and rotor into a subassembly, which is shown in exploded perspective view in FIG. 3. The housing 61 is closed at its ends by upper and lower closure plates 75, 77 creating large upper and lower plenums 79, 81. Snap rings (not shown) or other suitable locking ring arrangements are received in grooves 82 in the housing to secure the closure plates 75, 77 in position. An upper, axially aligned conduit 83 passes through a central aperture in the upper end closure plate 75, and its passage is suitably sealed at the inner surface of the closure plate. A similar conduit 85 passes axially through the lower end closure plate 77. An upper side conduit 87 enters through the sidewall of the housing and communicates with the upper plenum 79 between the plate 75 and the end cover 69, and a lower side conduit 89 leads to a similar lower plenum 81.

In contrast to the FIG. 1 prior art embodiment, and as best seen in the exploded perspective view of FIG. 3, the illustrated embodiment of the cylindrical rotor 63 employs quite a large number of longitudinal channels 65 which are generally pie-shaped in cross-section and spaced uniformly about the center axis. For example, 22 channels are shown which are equiangularly spaced about the central axis in an annular region, with each channel 65 constituting an annular segment of about 13-14° of the 360°. The central stator 67 is suitably mated with one or both of the end covers 69, 71, e.g. as by short dowel pins (not shown) received in three holes 90 in the axially inward surfaces 70 of the end covers and facing holes in the stator, and provides a stable rotational platform for the rotor. The center tension rod 73 unites this subassembly to rigidly join the two end covers 69, 71 to the stator 67; the rotor revolves about the stator between the axially inward surfaces 70 of the end covers. A surrounding cylindrical bushing may optionally be included; however, hydrodynamic bearing surfaces 91 between stator 67 and the interior cylindrical surface of the rotor lubricated by the high pressure fluid is preferred and has certain advantages in this overall arrangement. This construction differs from the basic arrangement of end covers which engage a sleeve at their peripheries as used in many prior art rotary pressure transfer devices such as that shown in FIG. 1. Although an outer sleeve construction might alternatively be used, as illustrated and described hereinafter with respect to FIG. 4, the present construction has surprising advantages when used with the improved end covers that are described herebelow. It should be more efficient because of the smaller circumference of the axially spaced cylindrical bearing surfaces 91 and the reservoir 92 which they flank, and it should result in a decreased amount of lubrication flow and leakage therethrough.

The two end covers 69, 71 are of generally similar construction, being essentially mirror images of each other except possibly for the entrance angles of the inlet passageways in the regions adjacent their openings into the flat surfaces 70. Instead of only two passageways traversing each of the end covers, as in the rotary pressure transfer device 11 shown in FIG. 1, each end cover 69, 71 has four passageways. The four passageways terminate at generally kidney bean-shaped openings 93 in the axially inward end surface 70 of each end cover, which openings are of the same size and shape and are equiangularly spaced at 90° intervals about the center of the end cover. Details of the interior shapes of the passageways are set forth in the disclosure of the aforementioned '557 U.S. patent. In the illustrated embodiment, these passageways through the end covers open into four circular apertures in the axially outer surface of each end cover 69, 71.

Figure 4:
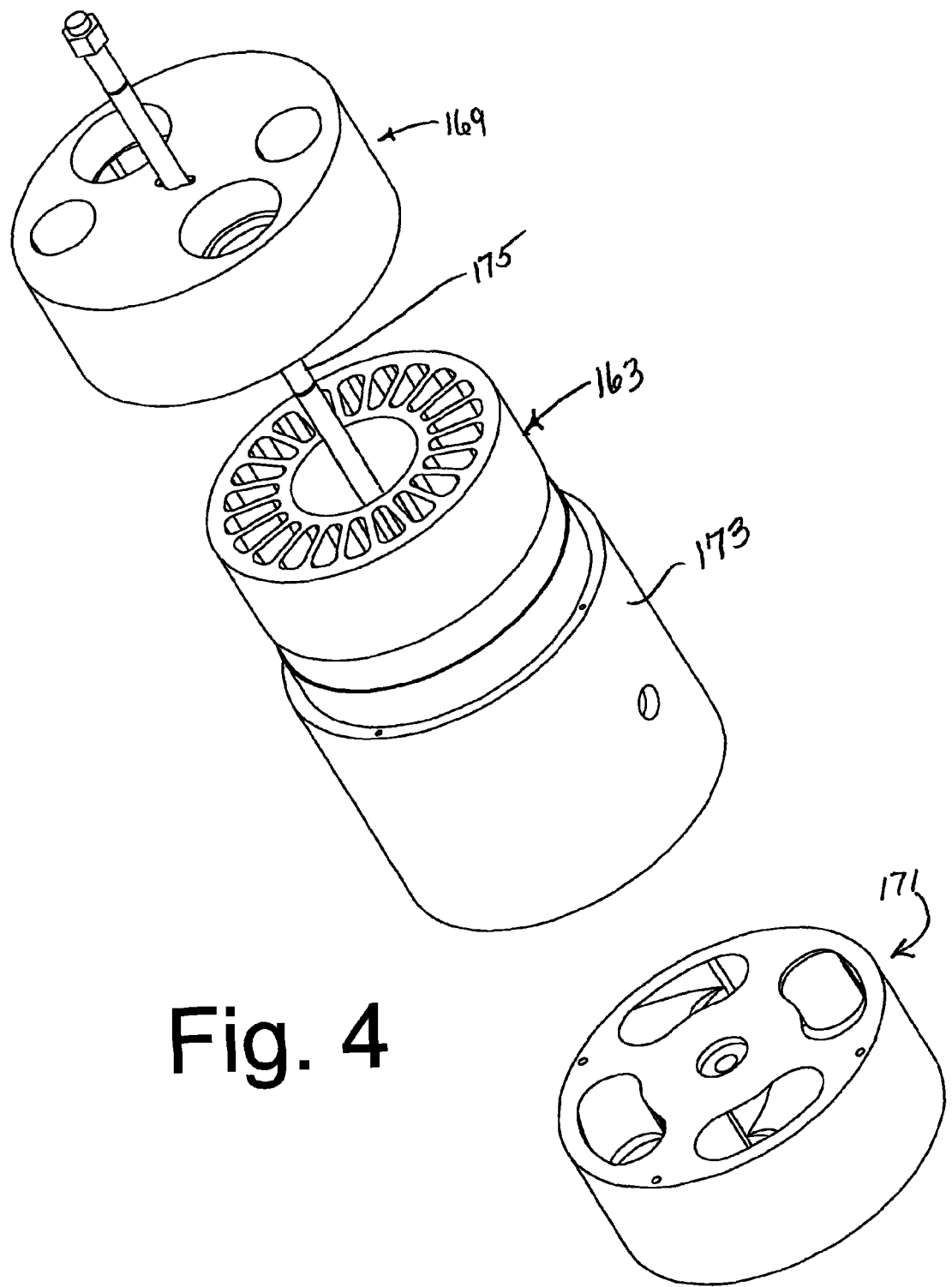
FIG. 4 is an exploded perspective view similar to FIG. 3 of an alternative embodiment of rotor and end cover subassembly which employs a surrounding sleeve and might be used in the pressure transfer device of FIG. 2 instead of the FIG. 3 subassembly.

In each end cover, each pair of diametrically opposite passageways serves a similar purpose, either as inlet passageways or as discharge passageways. As a result of this arrangement, it should be apparent that, during each revolution of the rotor 63, each of the longitudinal channels 65 will be sequentially supplied with high pressure liquid entering from one end of the device, through two openings 93 diametrically opposed to each other, and thus will twice discharge the now-elevated-pressure second liquid through one of two aligned discharge openings 93 in the opposite cover. Refilling with lower pressure liquid through the opposite end cover will also occur twice. Thus, during a single revolution of the rotor 63, high pressure liquid will be discharged twice from each longitudinal channel 65; this essentially doubles the capacity of the device 59 to discharge high pressure liquid during each revolution of the rotor, as compared to a prior art device that uses one inlet in each end cover and one generally diametrically opposed outlet passageway in each end cover. The overall operation of the rotary pressure transfer devices as described and shown in FIGS. 2, 3 and 4 is otherwise generally the same as the prior art device depicted in FIG. 1, except for the improved end covers and the associated components illustrated in FIG. 3.

More specifically, as can be seen in FIG. 3, the upper and lower end covers 69, 71 are constructed so as to each have two or more inlet passageways and to each have two or more outlet passageways. In this embodiment, all four of the passageways in each end cover terminate in circular openings at the axially outward surfaces of the end covers 69, 71. The pair of larger openings 95 in the upper end cover 69 are constructed so as to receive the respective ends of a branched conduit 99 that extends between the end cover 69 and the axial conduit 83 which passes through the upper end closure plate 75. A similar branched conduit 99 connects the lower axial conduit 85 to the larger openings in lower end cover 71. The smaller circular passageway openings 97 in the axially outer surface of each end cover communicate directly with the respective high pressure plenum chambers 79, 81 and through them with the side ports 87, 89 through the housing 61. Interiorly, the passageways in the end covers are smoothly transitioned between the circular openings 95, 97 in the outward surface and the more or less kidney bean-shaped openings 93 in the flat inward surface 90 of each end cover, which flat surface 90 is juxtapositioned with one end face 68 of the rotor 63. Details of such interior contouring of the inlet passageways that may be employed for the end covers are described in the previously mentioned '557 U.S. patent; all four discharge passageways may be similarly contoured. In the illustrated embodiment, all the eight passageways have ramps 101 adjacent the openings 93 in the two end covers and serve to power the rotor 63.

Although all four passageways in each end cover might be similarly contoured, it may be advantageous to shape the pairs of high pressure inlet and discharge passageways to have different geometries than the pairs of low pressure inlet and discharge passageways to facilitate the performance of the particular passageways. For example, the high pressure inlet passageways in the upper end cover 69 might terminate in ramps 101 that are oriented (e.g. at about 7° to 40° to the flat surface) to create a greater amount of impact force to spin the rotor; the discharge passageways at the opposite end would generally be similarly contoured. On the other hand, the ramps 101 which direct flow of the low pressure seawater from the inlet passageways in the lower end cover 71 and into the rotor channels might, if desired, be aligned differently from these ramps in the high pressure passageways and at a greater angle (e.g. they might be oriented at about 25° to 50° to the flat face). Such arrangement might minimize turbulence and potential mixing.

As an example of operation in connection with a seawater desalination plant, high pressure brine may be supplied to such a pressure transfer device 59 through the side port 87 to fill the inlet plenum chamber 79 through which it would flow through the two smaller diameter openings 97 and into inlet passageways 103 in the upper end cover 69. In these passageways, the flowing liquid is directed into the upper ends of the rotor channels 65 while they are momentarily aligned therewith, entering past the oblique discharge ramp 101 at the opening 93; this directional entry of the high pressure brine may be used as the primary source of power to cause the rotor 63 to revolve. The other two passageways 105 in the end cover 69 constitute the pair of diametrically opposed outlet or discharge passageways for the brine after it has transferred most of its superatmospheric pressure. The similarly sized kidney bean-shaped openings 93 in the inward surface 70 of each end cover are angularly spaced apart a sufficient arcuate distance from one another so as to constitute a seal of greater width than the width of each channel opening in the rotor end face; thus, a longitudinal channel 65 in the rotor cannot at the same time be in fluid communication with both an inlet passageway and an outlet passageway in the same end cover.

When there are more than one inlet passageway and one outlet passageway in an end cover, it is important to provide spacing such that one channel cannot at the same time be in direct fluid communication with both an inlet passageway and an outlet passageway in the same end cover. As a result, it is important to be able to locate the kidney bean-shaped openings 93 in the radially outer region of the end covers reasonably close to the periphery of the circular end covers where the circumferential dimension is greater. Such an arrangement is facilitated by the ability to eliminate the thickness of the surrounding sleeve used in the prior art, which then becomes available space so that a larger diameter rotor can be accommodated. As can be seen from FIG. 3, this allows the rotor channels 65 to be extended radially outward and accordingly to have wider regions at their radially outward ends. Such an arrangement both increases the volume of a channel and facilitates its filling, which is particularly important when you are filling each channel twice during one revolution. In addition, when such a stator 67 is used instead of a circumferential exterior sleeve, the juxtaposed angular wall surfaces that serve as bearing surfaces 91 are substantially less in surface area and thus would inherently exert less drag on the revolving rotor 63. In addition, it is found that such location of the bearing surfaces surprisingly renders assembly of the device, by matching tolerances, surprisingly simpler while also facilitating assurance of continuous and adequate lubrication. This arrangement allows the high pressure liquid which serves as the lubrication fluid to be readily supplied to the reservoir 92 through a radial passageway 92a located in the sidewall of the stator 67 which interconnects the reservoir with the annular void space 92b between the tension rod 73 and the interior surface of the hollow stator 67. This annular space is kept full of high pressure liquid through an enlarged passageway in one of the end covers through which the tension rod 73 passes, preferably that end cover through which the seawater enters and is discharged. Accordingly, the arrangement assures that the reservoir remains filled with liquid under high pressure to assure lubrication of these bearing surfaces which is an important feature.

Accordingly, as the rotor 63 revolves, each pie-shaped channel 65 in the rotor will move into alignment with, for example a kidney bean-shaped inlet opening 93 of the high pressure brine inlet passageway 103 at the upper end and, simultaneously, with a similarly shaped opening 93 into an outlet passageway 107 in the opposite lower end cover 71 that leads to the high pressure seawater discharge side port 89 via the lower plenum 81. Accordingly, an amount of high pressure brine equal to about 50%-90% of the volume of the longitudinal channel 65 will rapidly flow into the channel prior to that channel reaching the seal area between adjacent openings 93 in the flat end surface 70. This, of course, discharges an equal volume of now pressurized seawater from the opposite end, which flows into the plenum 81 and then out through the side discharge port 89. As soon as this channel 65 reaches the next two aligned openings 93 in the inward flat surfaces of the end covers 69, 71, low pressure seawater (e.g. 40 psig), supplied through the lower axial entry conduit 85 and the branched conduit 99 to two inlet passageways 109 in the lower end cover 71, flows into the opposite (lower) end of the rotor channel 65, again to an amount of between about 50% to 90% of its volume. This discharges the now low pressure brine through the outlet passageway 105 in the upper end leading to the branched low pressure brine discharge conduit 83.

Thus, it can be seen that the pressurizing/pumping cycle for one longitudinal channel 65 in the rotor 63 (that heretofore occurred only once during a complete revolution of the rotor in the prior art devices) is now achieved in only about 180° of revolution, so that the just-described operation is repeated during the next 180° of revolution, thus pumping occurs twice during each revolution of the rotor. As a result, during each 360° revolution of the rotor 63, the device 59 is capable of pressurizing/pumping essentially twice the volume of liquid in a longitudinal channel of the same size.

Moreover, it can be seen from FIG. 3 that the sizing of the channels 65 in the rotor 63 is such that more than one channel will always be in registration with any one kidney bean-shaped opening 93 in one of the end covers. However, because the interior shaping of the inlet passageways 103, 109 in the respective end covers 69, 71 is such that liquid smoothly flows through these passageways, there is assurance that the respective filling of the channels 65 to the desired extent and discharge therefrom is achieved during the short time that each channel is in registration with the pairs of aligned inlet and outlet openings in the end covers at the opposite ends of the device. Thus, it can be seen that this ability to twice partially fill each channel 65 with liquid to be pressurized and to then twice discharge that pressurized liquid during each revolution of the rotor 63 affords a substantially more efficient operation.

Although the invention has been described with regard to certain preferred embodiments which constitute the best mode presently known to the inventor for carrying out this invention, it should be understood that various changes and modifications as would be obvious to those skilled in the art may be made without deviating from the scope of this invention which is defined by the claims pended hereto. For example, although only two inlets and two outlets are shown in the illustrated arrangement of end covers of FIG. 3, it should be understood that a greater number could also be used, and such would be rendered more easily feasible in end covers of larger diameter. For example, the provision of three inlets and three outlets, each spaced at 60° angular increments about the axis of the rotor, in a rotary pressure transfer device of this type, particularly one of even greater diameter, would allow three fills and three discharges at each end of the device during each revolution of the rotor. Moreover, as previously mentioned, instead of employing the preferred stator 67 to provide bearing surfaces about which the rotor revolves, an arrangement could be employed as illustrated in FIG. 4. A pair of multi-inlet multi-outlet end covers substantially similar to the end covers 69, 71, could be employed with a rotor 163 and a surrounding sleeve 173 similar to the arrangement shown in FIG. 1. With such a construction, the tension rod 175 would unite the end covers 169, 171 and the sleeve 173 as a subassembly, creating a right circular cylindrical chamber in which the rotor 163 would revolve as in the FIG. 1 embodiment. Particular features of the invention are emphasized in the claims which follow.

The invention claimed is:

1. A pressure transfer device for transferring pressure energy from a high pressure first liquid to a lower pressure second liquid to provide a pressurized second liquid, which device comprises:
    a rotatably mounted cylindrical rotor having a pair of opposite planar end faces with a plurality of channels extending axially therethrough between openings located in said planar end faces; and
    a pair of opposite end covers having axially inward and outward end surfaces, with said axially inward end surfaces of each having flat regions that interface with and slidingly and sealingly engage said respective planar end faces of said rotor,
    each said end cover having two or more inlet passageways and two or more discharge passageways which at least four passageways open into said axially inward end surfaces, said end covers being aligned so that when one said channel in said rotor is aligned with an inlet passageway opening in one said end cover, it is also aligned with a discharge passageway opening of substantially the same size in said opposite end cover, said inlet passageway openings and said discharge passageway openings in said same end cover being constantly sealed from one another during the operation by a sealing region at an interface between said rotor planar end face and said end cover inward end surface,
    whereby, at least twice during each revolution of said rotor, said rotor channel openings are, in alternating sequence, brought into full alignment with both one of said inlet passageway openings in one said end cover and one of said discharge passageway openings in the opposite said end cover and then into full alignment with both one of said discharge passageway openings in said one end cover and one of said inlet passageway openings in said opposite end cover, so that each said rotor channel is at least twice during each revolution supplied with the high pressure first liquid and at least twice discharges pressurized second liquid.

2. The pressure transfer device according to claim 1 wherein said inlet passageways in said one end cover, through which said high pressure first liquid would flow, have oblique ramps adjacent said surface openings which create directional liquid outflows into said rotor channels and wherein said aligned outlet passageways also have similar oblique ramps, as a result of which said rotor is caused to revolve.

3. The pressure transfer device according to claim 2 wherein said oblique ramps in said high pressure inlet passageways in said one end cover are aligned at between about 7° to 40° to the planar end face of said rotor.

4. The pressure transfer device according to claim 3 wherein said oblique ramps in said low pressure inlet passageways in said opposite end cover are aligned at a greater angle to the planar end face of said rotor than said oblique ramps in said high pressure inlet passageways in said one end cover.

5. The pressure transfer device according to claim 4 wherein said oblique ramps in said low pressure inlet passageways in said opposite end cover are aligned at an angle of about 25° to 50° to the planar end face of said rotor.

6. The pressure transfer device according to claim 1 wherein each said end cover has two of said inlet passageways and two of said outlet passageways which respectively connect to four openings in the axially inward end surface which openings are of substantially the same size and shape, and which are equiangularly located on said end surface.

7. The pressure transfer device according to claim 1 wherein said rotor revolves about a stator that is interconnected with both said end covers.

8. The pressure transfer device according to claim 7 wherein said stator has two axially spaced apart lateral bearing surfaces, with a circumferential groove therebetween which will hold a reservoir of liquid for lubricating said bearing surfaces.

9. The pressure transfer device according to claim 8 wherein a supply passageway extends generally radially inward from said groove and a branch passageway in said stator connects said supply passageway to a region of high pressure liquid.

10. The pressure transfer device according to claim 1 wherein said openings to said passageways are located in radially outer regions of said end covers close to the periphery thereof.

11. The pressure transfer device according to claim 1 wherein said rotor revolves within a circumscribing sleeve, the opposite ends of which sleeve abut said pair of end covers.

12. A pressure transfer device for transferring pressure energy from a high pressure first liquid to a lower pressure second liquid to provide a pressurized second liquid, which device comprises:
  a rotatably mounted cylindrical rotor having a pair of opposite planar end faces with a plurality of channels extending axially therethrough between openings located in said planar end faces;
  a pair of opposite end covers having axially inward and outward end surfaces and having inlet and discharge passageways, said axially inward end surfaces of each end cover having flat regions that interface with and slidingly and sealingly engage said respective planar end faces of said rotor, said inlet and discharge passageways connecting to openings in said axially inward end surfaces, and said end covers being aligned so that when one said channel in said rotor is aligned with one said inlet passageway opening in one said end cover, it is also aligned with one said discharge passageway opening in said opposite end cover, said inlet passageway openings and each said discharge passageway openings in said same end cover being constantly sealed from one another during the operation by a sealing region at an interface between said rotor planar end face and said end cover; and
  a stator that is interconnected with both said end covers about which said rotor revolves,
  said stator having two spaced apart lateral bearing surfaces, with a circumferential groove therebetween which will hold a reservoir of liquid for lubricating said bearing surfaces, having a supply passageway which extends generally radially inward from said groove, and having a branch passageway which connects said supply passageway to an interior region of high pressure liquid within the pressure transfer device,
  whereby during revolution of said rotor said rotor channel openings are, in alternating sequence, brought into full alignment with both an inlet passageway opening in one said end cover and a discharge passageway opening in the opposite said end cover and then into full alignment with both a discharge passageway opening in said one end cover and an inlet passageway opening in said opposite end cover, at least twice during each revolution of said rotor, so that each said channel is at least twice supplied with the high pressure first liquid and at least twice discharges pressurized second liquid.

13. The pressure transfer device according to claim 12 wherein said inlet passageways in said one end cover, through which said high pressure first liquid would flow, have oblique ramps adjacent said surface openings which create directional liquid outflows into said rotor channels and wherein said aligned outlet passageways also have similar oblique ramps, as a result of which said rotor is caused to revolve.

14. The pressure transfer device according to claim 13 wherein said oblique ramps in said inlet passageways in said one end cover are aligned at between about 7° to 40° to the planar end face of said rotor.

15. The pressure transfer device according to claim 14 wherein said oblique ramps in said inlet passageways in said opposite end cover are aligned at a greater angle to the planar end face of said rotor than said oblique ramps in said one end cover.

16. The pressure transfer device according to claim 15 wherein said oblique ramps in said inlet passageways in said opposite end cover are aligned at an angle of about 25° to 50° to the planar end face of said rotor.

17. A method for transferring pressure energy from a high pressure first liquid to a lower pressure second liquid to provide a pressurized second liquid, which method comprises the steps of:
  rotatably mounting a cylindrical rotor in a housing, which rotor has a pair of opposite planar end faces and has a plurality of channels extending longitudinally therethrough between openings located in said planar end faces;
  disposing a pair of opposite end covers in the housing having axially inward surfaces with flat surface regions so that their axially inward end surfaces interface with and slidingly and sealingly engage said planar end faces of said rotor, which end covers each have a plurality of inlet passageways and a plurality of discharge passageways which open into said flat surface regions in openings of substantially the same size,
  supplying a high pressure first liquid to said inlet passageways in one end cover while simultaneously discharging a pressurized second liquid from said aligned discharge passageways in the end cover at the opposite end, and
  causing said rotor to revolve about its axis so said channels are respectively brought into full alignment with one of said inlet passageway openings in one end cover and one of said discharge passageway openings in the other end cover at least twice during each revolution of the rotor, whereby an increased volume of pressurized second liquid is discharged for each revolution of the rotor because each channel is supplied with liquid and discharged at least twice.

18. The method according to claim 17 wherein said rotation of said rotor is caused by the directional entry of at least said high pressure liquid into said channels past oblique ramps.

19. The method according to claim 18 wherein said high pressure liquid is caused to enter said channels at one end of said rotor at two of four equiangularly spaced apart said openings in one said end cover past said oblique ramps oriented at between 7° and 40° to the adjacent flat surface and said low pressure liquid is caused to enter the channels at two of four equiangularly spaced apart said openings in said other end cover at the opposite end of said rotor past said oblique ramps oriented at between 25° and 50° to the adjacent flat surface.

20. The method according to claim 17 wherein said rotor rotates about a stator having two axially spaced bearing surfaces separated by a circumferential groove which groove is fed with high pressure liquid through a radial passageway to lubricate said bearing surfaces.

\* \* \* \* \*